United States Patent
Jeerage et al.

(10) Patent No.: US 8,260,552 B2
(45) Date of Patent: Sep. 4, 2012

(54) SYSTEMS AND METHODS FOR DETERMINING LOCATION INFORMATION USING DUAL FILTERS

(75) Inventors: Mahesh Jeerage, New Brighton, MN (US); Fan Liu, Shawnee, KS (US)

(73) Assignee: Honeywell International Inc., Morristown, NJ (US)

( * ) Notice: Subject to any disclaimer, the term of this patent is extended or adjusted under 35 U.S.C. 154(b) by 965 days.

(21) Appl. No.: 12/113,048

(22) Filed: Apr. 30, 2008

(65) Prior Publication Data

US 2009/0276155 A1 Nov. 5, 2009

(51) Int. Cl.
*G01C 21/00* (2006.01)
(52) U.S. Cl. ........ 701/480; 701/408; 701/468; 701/469; 701/472; 701/473; 701/479
(58) Field of Classification Search .................. None
See application file for complete search history.

(56) References Cited

U.S. PATENT DOCUMENTS

| | | | |
|---|---|---|---|
| 5,184,304 A | 2/1993 | Huddle | |
| 5,583,774 A | 12/1996 | Diesel | |
| 5,923,286 A * | 7/1999 | Divakaruni | 342/357.44 |
| 6,278,945 B1 * | 8/2001 | Lin | 701/216 |
| 6,424,914 B1 | 7/2002 | Lin | |
| 6,549,829 B1 * | 4/2003 | Anderson et al. | 701/16 |
| 6,721,657 B2 * | 4/2004 | Ford et al. | 701/213 |
| 7,193,559 B2 * | 3/2007 | Ford et al. | 342/357.32 |
| 2005/0114023 A1 * | 5/2005 | Williamson et al. | 701/214 |
| 2007/0282529 A1 * | 12/2007 | Thompson et al. | 701/220 |
| 2009/0278740 A1 | 11/2009 | Petillon | |

FOREIGN PATENT DOCUMENTS

| | | |
|---|---|---|
| EP | 1862763 | 5/2007 |
| FR | 2898196 | 7/2007 |

OTHER PUBLICATIONS

European Patent Office, "European Search Report", mailed May 29, 2012, Published in: EP.

* cited by examiner

*Primary Examiner* — Khoi Tran
*Assistant Examiner* — Bao Long T Nguyen
(74) *Attorney, Agent, or Firm* — Fogg & Powers LLC

(57) ABSTRACT

System and methods of increasing reliability of determined location information by using two integration filters are provided. An exemplary embodiment integrates inertial navigation system information and global navigation satellite system (GNSS) information in a real time Kalman filter; determines a real time location of the aircraft with the real time Kalman filter based upon the INS information and the GNSS information; delays the GNSS information by an interval; integrates the INS information and the delayed GNSS information in a delay Kalman filter; determines a predictive location of the aircraft with the delay Kalman filter based upon the INS information, the delayed GNSS information, and the interval; and in response to an inaccuracy of the real time location determined from the real time Kalman filter, selects the predictive location determined from the delay Kalman filter as a new real time location of the aircraft.

18 Claims, 2 Drawing Sheets

SYSTEMS AND METHODS FOR DETERMINING LOCATION INFORMATION USING DUAL FILTERS

BACKGROUND OF THE INVENTION

An aircraft inertial navigation system is typically integrated with a global navigation satellite system (GNSS) receiver to provide reliable and continuous location information to assist the aircraft in performing various maneuvers, particularly when the aircraft is landing. In such systems, the information from the inertial navigation system and the information from the GNSS receiver are integrated together using a Kalman filter. The Kalman filter generates high integrity and continuous location information. The use of Kalman filters, and other types of filters, are well known.

For example, U.S. Pat. No. 5,184,304 to Huddle, entitled "Fault-Tolerant Inertial Navigation System," U.S. Pat. No. 5,583,774 to Diesel, entitled "Assured-Integrity Monitored-Extrapolation Navigation Apparatus," and U.S. Pat. No. 6,549,829 to Anderson et. al, entitled "Skipping Filter For Inertially Augmented Landing System," all of which are incorporated by reference herein in their entirety, are examples of such integrated navigation systems that use filters to provide high integrity and continuous location information.

The reliability of the location information provided by the GNSS receiver is a critical issue. If the location information provided by the GNSS receiver is inaccurate, or if the information is not available from the GNSS receiver, then sufficiently accurate location information may not be available to assist the aircraft in its performing various maneuvers. An exemplary fault mode may occur if one or more of the electronic components of the GNSS satellite, or the GNSS receiver fails, such that the location information becomes inaccurate. In such situations, location information from the GNSS receiver should not be used. Another exemplary fault mode may occur if the clock times used by the GNSS satellites drift and become sufficiently inaccurate so as to render the output location information inaccurate. Or, one or more of the GNSS satellites may not be in its expected orbital location, such as when a GNSS satellite moves in an unexpected or unknown manner from its designated orbital route, such that the determined location information based upon a signal received from the GNSS satellite is incorrect. Other fault modes may occur if the information from the GNSS system is not available. An exemplary fault mode in this case is one or more GNSS satellites signals are blocked from being received by the GNSS receiver, such that not enough GNSS signals are available for determining the user location information.

SUMMARY OF THE INVENTION

Systems and methods of increasing reliability of determined location information by using two integration filters are provided. An exemplary embodiment has a real time filter that is operable to receive first location information from an inertial navigation system, that is operable to receive second location information from a global navigation satellite system (GNSS) receiver, and that is operable to determine real time location information of the aircraft based upon integration of the first location information and the second location information; a time interval unit operable to receive the second location information from the GNSS receiver, and operable to delay the received second location information by a time interval; a delay filter communicatively coupled to the time interval unit, operable to receive from the inertial navigation system the first location information, operable to receive from the time interval unit the second location information delayed by the interval, and operable to determine predictive location information of the aircraft based upon the first location information, the second location information delayed by the interval, and the interval; and an airborne GNSS device that is operable to identify a corruption of the second location information, and in response to determining that the second location information is corrupted, that is further operable to cause the predictive location information to be output to at least one of a flight management system and an auto pilot system.

In accordance with further aspects, an exemplary embodiment integrates inertial navigation system information and GNSS information in a real time Kalman filter; determines a real time location of the aircraft with the real time Kalman filter based upon the inertial navigation system information and the GNSS information; delays the GNSS information by an interval; integrates the inertial navigation system information and the delayed GNSS information in a delay Kalman filter; determines a predictive location of the aircraft with the delay Kalman filter based upon the inertial navigation system information, the delayed GNSS information, and the interval; and in response to an inaccuracy of the real time location determined from the real time Kalman filter, selects the predictive location determined from the delay Kalman filter as a new real time location of the aircraft.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
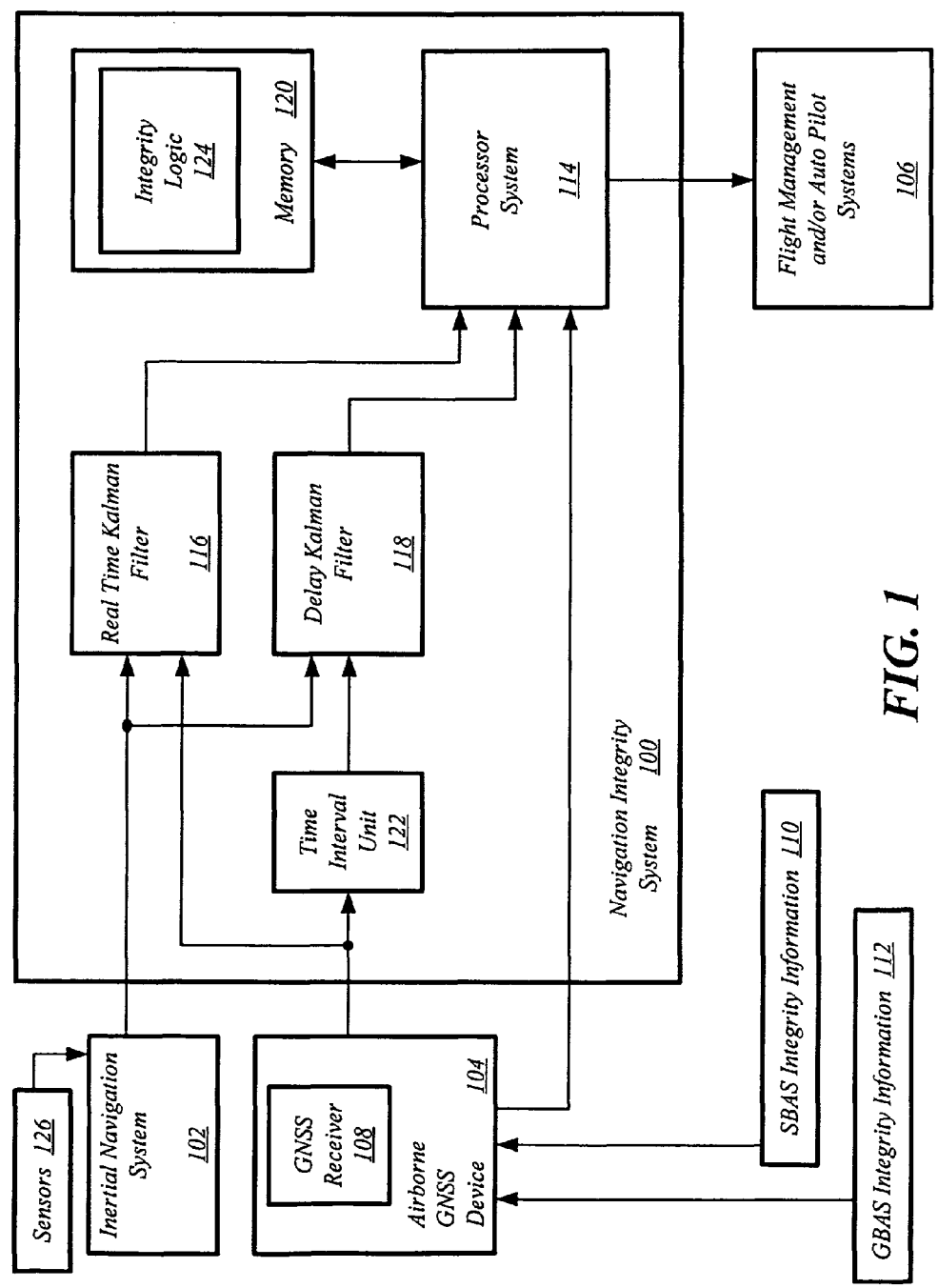
FIG. 1 is a block diagram of an embodiment of a navigation integrity system.

FIG. 1 is a block diagram of an embodiment of a navigation integrity system 100. The exemplary embodiment of the navigation integrity system 100 receives location information from an inertial navigation system 102 and an airborne global navigation satellite system (GNSS) device 104. The navigation integrity system 100 integrates the received GNSS location information with the inertial navigation system 102 such that a highly accurate and reliable location of the aircraft is communicated to the flight management and/or auto pilot systems 106. It is appreciated that the location information determined by the navigation integrity system 100 may be provided to other aircraft systems.

Integrity of the location information provided by the airborne GNSS device 104 should be maintained if the navigation integrity system 100 is to provide accurate location information to the flight management and/or auto pilot systems 106. The provided accurate location information aids in the various maneuvers performed by the aircraft, such as, but not limited to, landing.

The airborne GNSS device 104 includes a GNSS receiver 108 that determines location information based upon the reception of signals transmitted by a plurality of GNSS satellites. As noted above, the GNSS receiver 108 may not provide accurate information if various fault modes occur. An exemplary fault mode may occur when a GNSS satellite is transmitting a signal with an incorrect time (caused by time clock drifting). Yet another exemplary fault mode may occur when the GNSS satellite is not in its designated orbital position (caused by movement of the GNSS satellite in an unexpected or unknown manner from its designated orbital route). Other exemplary fault modes may occur when a component of the on-board airborne GNSS device 104 and/or the on-board GNSS receiver 108 fails such that the location information is no longer output by the on-board airborne GNSS device 104. Accordingly, embodiments of the navigation integrity system 100 are operable to determine that the location information output by the airborne GNSS device 104 is inaccurate and/or if the information is no longer available.

Fault modes may be detected by a satellite based augmentation system (SBAS) which monitors the integrity of the information transmitted in a GNSS satellite signal. The SBAS (not shown), typically residing in geo-synchronous GNSS satellites, indicates presence of an error in the GNSS satellite signal or some other problem in the GNSS satellite. A fault indication signal, the SBAS integrity information 110, is received by the airborne GNSS device 104 and indicates the inaccuracy of the real time location determined by the GNSS receiver 108. The SBAS integrity information 110 may be separately transmitted or integrated into the GNSS signal. The SBAS integrity information 110 is then communicated from the GNSS satellite. The SBAS integrity information 110 may be received by the GNSS receiver 108 directly (such as when the fault indication signal generated by the SBAS integrity monitor 110 is integrated into the GNSS satellite signal). Under current available technologies, the SBAS integrity information 110 is received by the airborne GNSS device 104 with no more than thirty seconds delay. (It is appreciated that the time to receive the SBAS integrity information 110 may become less with improving SBAS technologies.)

Alternatively, or additionally, fault modes occurring at the GNSS satellite may be detected by a ground based augmentation system (GBAS) which monitors the integrity of the information transmitted in the GNSS satellite signal. The GBAS (not shown), typically resides in a land-based installation that monitors GNSS satellite signals. The GBAS indicates presence of an error or fault in the information transmitted in the GNSS satellite signal or may indicate other problems with the GNSS satellite, such as when a satellite control center indicates a problem with the GNSS satellite. GBAS integrity information 112 is communicated from the GBAS to the airborne GNSS device 104 on the aircraft and indicates the inaccuracy of the real time location determined by the GNSS receiver 108. Under current available technologies, the GBAS integrity information 112 is received by the airborne GNSS device 104 with no more than six seconds delay. (It is appreciated that the time to receive the GBAS integrity information 112 may become less with improving GBAS technologies.)

The exemplary embodiment of the navigation integrity system 100 illustrated in FIG. 1 has a processor system 114, a real time Kalman filter 116, a delay Kalman filter 118, a memory 120, and a time interval unit 122. In the exemplary embodiment, integrity logic 124 resides in the memory 120. The integrity logic 124 is retrieved and executed by the processor system 114. The operational functions of the integrity logic 124 are described below. Alternatively, the functions may be implemented as firmware, or a combination of firmware and software, by alternative embodiments of the navigation integrity system 100.

As noted above, the inertial navigation system 102 generates real time location information. The inertial navigation system 102 is a well-known system that determines the real time location information based on various sensors 126 in the aircraft, such as acceleration sensors (accelerometers), rotation sensors (gyros), heading sensors (magnetometer), altitude sensors (barometric altitude), and the like (not shown). Based on a previous known location (which is presumed accurate), the inertial navigation system 102 computes the real time location based on the information provided by the above-described sensors.

The real time Kalman filter 116 receives location information from the inertial navigation system 102 and the airborne GNSS device 104. The received location information is integrated together by the real time Kalman filter 116 to generate accurate real time location information (assuming that location information received from the inertial navigation system 102 and the airborne GNSS device 104 are both accurate within design accuracy thresholds). The real time location information is communicated from the real time Kalman filter 116 to the processor system 114. The processor system 114 communicates real time location information to the flight management and/or auto pilot systems 106 to aid in the various maneuvers performed by the aircraft, such as, but not limited to, landing. (It is appreciated that the real time location information determined by the real time Kalman filter 116 may be provided to other aircraft systems.)

The time interval unit 122 also receives location information from the airborne GNSS device 104. A predefined time interval is added to the information received from the airborne GNSS device 104, thereby resulting in a time delay corresponding to the interval when the location information is communicated from the time interval unit 122.

In an exemplary embodiment that is monitoring the GBAS integrity information 112, the time interval is approximately equal to six seconds. Six seconds corresponds to a time period that is sufficient for verification of the integrity of the location provided by the airborne GNSS device 104 based upon the GBAS integrity information 112. In another exemplary embodiment that is monitoring the SBAS integrity information 110, the time interval is approximately equal to thirty seconds. Thirty seconds corresponds to a time period that is sufficient for verification of the integrity of the location provided by the airborne GNSS device 104 based upon the SBAS integrity information 110. Any suitable time interval may be used by the various embodiments of the navigation integrity system 100 corresponding to the times associated with receiving and/or processing the SBAS integrity information 110 and/or GBAS integrity information 112.

The delay Kalman filter 118 receives the time delayed location information from the time interval unit 122 and location information from the inertial navigation system 102. This location information is integrated together by the delay Kalman filter 118 to generate accurate location information that is delayed by the time period delay (assuming that received location information from the inertial navigation system 102 and the airborne GNSS device 104 are both accurate within the design accuracy thresholds).

Then, the delay Kalman filter 118 computes a predictive location from the time delayed location information received from the time interval unit 122 and location information received from the inertial navigation system 102. That is, the delay Kalman filter 118 receives the time delayed location information from the time interval unit 122 and location information from the inertial navigation system 102, integrates this location information, and then generates a predictive location for the aircraft. The predictive location information is communicated from the delay Kalman filter 118 to the processor system 114.

Embodiments of the navigation integrity system 100 are operable to assess the integrity of the real time location information provided by the real time Kalman filter 116. In the event that the navigation integrity system 100 determines that the real time location information provided by the real time Kalman filter 116 has become corrupted (no longer accurate within acceptable tolerances), the navigation integrity system 100 provides the predictive location information from the delay Kalman filter 118 to the flight management and/or auto pilot systems 106. (It is appreciated that the predictive location information determined by the delay Kalman filter 118 may be provided to other aircraft systems.)

Because the time interval introduced by the time interval unit 122 is preferably greater than the time required for determining that the real time location information provided by the real time Kalman filter 116 has become corrupted, embodiments of the navigation integrity system 100 are able to change over from the corrupted real time location information to the predictive location information such that the flight management and/or auto pilot systems 106 continuously receive sufficiently accurate location information for purposes of navigation. That is, since the location information determined by the GNSS receiver 108 was accurate when originally collected (at the earlier time which corresponds to the delay time), the predictive location information determined by the delay Kalman filter 118 (based on the altitude, speed and heading in effect at the time that the delayed location information was determined) will be sufficiently accurate for navigation of the aircraft. Accordingly, the delay Kalman filter 118 uses the altitude, speed and heading of the aircraft, the time interval, the time delayed location information and the information from the various sensors 126 in the aircraft to accurately predict the location of the aircraft.

For example, an exemplary embodiment of the navigation integrity system 100 uses a six second delay time when the GBAS integrity information 112 is used to assess integrity of the location information determined by the GNSS receiver 108. Assume that the real time location information provided by the real time Kalman filter 116 is valid at a current time, $t_0$. The predictive location information determined by the delay Kalman filter 118, based upon information collected six seconds earlier ($t_{0-6}$), and forward predicted by the six second interval, is also accurate (assuming that the information collected six seconds ago was accurate).

Then, assume that at some time i the location information determined by the GNSS receiver 108 (at $t_i$ seconds) has become corrupted (no longer accurate within acceptable tolerances). The flight management and/or auto pilot systems 106 are then provided the predictive location information determined by the delay Kalman filter 118, which was determined based on information collected six seconds earlier (at $t_{i-6}$ seconds, which is six seconds after the current time $t_i$ seconds). Accordingly, the flight management and/or auto pilot systems 106 have accurate location information so that the aircraft may perform its various maneuvers, such as, but not limited to, landing.

Figure 2:
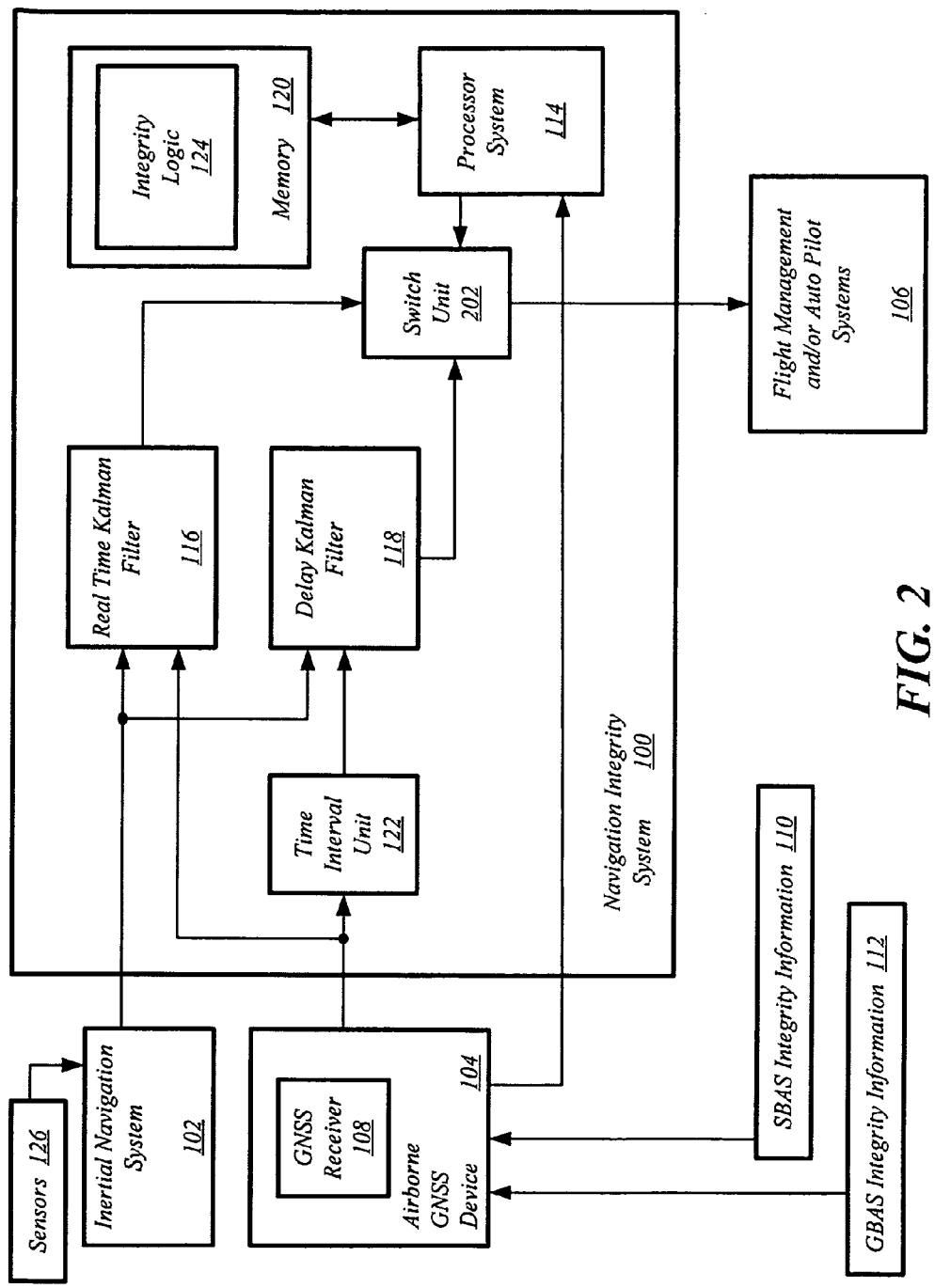
FIG. 2 is a block diagram of an alternative embodiment of the navigation integrity system.

FIG. 2 is a block diagram of an alternative embodiment of the navigation integrity system 100. This embodiment includes a switch unit 202 that is operable to communicate the real time location information determined by the real time Kalman filter 116 or the predictive location information determined by the delay Kalman filter 118. If the the SBAS integrity information 108 and/or GBAS integrity information 110 indicates that the real time location information determined by the GNSS receiver 108 is accurate, then the switch unit 202 communicates the real time location information from the real time Kalman filter 116 to the flight management and/or auto pilot systems 106. On the other hand, if the SBAS integrity information 108 and/or GBAS integrity information 110 indicates that real time location information determined by the GNSS receiver 108 is corrupt, then the switch unit 202 communicates the predictive location information determined by the delay Kalman filter 118 to the flight management and/or auto pilot systems 106.

In a preferred embodiment, the switch unit 202 is controlled by the processor system 114. Alternatively, the switch unit 202 may be controlled by the by another system device, such as, but not limited to, the airborne GNSS device 104. The switching functions performed by the switch unit 202 may be implemented with any suitable type of electronic, solid state, or firmware type switching device or means commonly employed in the art. For example, a processor-based switch unit 202 would be implemented using a combination of software and firmware using components and methods commonly employed in the art of switching electrical devices.

In an alternative embodiment, both the SBAS integrity information 108 and the GBAS integrity information 110 are monitored. In the event that the SBAS integrity information 108 indicates that the GNSS location information has been corrupted, a time interval corresponding to the SBAS integrity information 108 (here, the exemplary thirty seconds) is used. Thus, if the SBAS integrity information 108 indicates a corruption, the predictive location information determined by the delay Kalman filter 118 is based upon a time interval associated with the SBAS integrity information 108. Alternatively, in the event that the GBAS integrity information 110 indicates that the GNSS location information has been corrupted, a time interval corresponding to the GBAS integrity information 110 (here, the exemplary six seconds) is used. Thus, if the GBAS integrity information 110 indicates a corruption, the predictive location information determined by the delay Kalman filter 118 is based upon a time interval associated with the GBAS integrity information 110.

In such an embodiment, the time interval unit 122 may be have two buffers, or other suitable means, for storing location information provided by the airborne GNSS device 104. That is, location information corresponding to a first time interval (corresponding to the time interval associated with the SBAS integrity information 108) and a second time interval (corresponding to the time interval associated with the GBAS integrity information 110) are separately stored.

In an alternative embodiment, the time interval unit 122 and the delay Kalman filter 118 are integrated into a single device. The delay may be implemented as software, firmware, or a combination of both.

In an alternative embodiment, the filtering functions are implemented in another suitable integration filter type. For example, a skipping filter may be used. In other embodiments, the functionality of the Kalman filter is implemented as software, firmware, or a combination of software and firmware. Any suitable device or process that is operable to integrate location information generated by an inertial navigation system 102 and an airborne GNSS device 104 (or a GNSS receiver 108) may be used.

In another embodiment, the predictive location and the real time location are compared by the processor system 114. An inaccuracy of the real time location is determined when a difference between the real time location and the predictive location is different by a threshold distance.

The above-described embodiments determined a corruption of the GNSS location information based upon the SBAS integrity information 108 and/or the GBAS integrity information 110. In alternative embodiments, other information may be received and monitored to determine if the GNSS location information has been corrupted.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is: claimed are defined as follows:

1. A method for determining a real time location of an aircraft, comprising:
   receiving inertial navigation system information and global navigation satellite system GNSS information with a real time Kalman filter;
   determining the real time location of the aircraft with the real time Kalman filter based upon the inertial navigation system information and the GNSS information;
   delaying the GNSS information by an interval;
   receiving the undelayed inertial navigation system information and the delayed GNSS information with a delay Kalman filter;
   determining a predictive location of the aircraft with the delay Kalman filter based upon the inertial navigation system information, the delayed GNSS information, and the interval while determining the real time location with the real time Kalman filter; and
   in response to an inaccuracy of the real time location determined from the real time Kalman filter, selecting the predictive location determined from the delay Kalman filter as a new real time location of the aircraft.

2. The method of claim 1, wherein determining the predictive location of the aircraft further comprises:
   forward estimating the delayed GNSS information by the interval.

3. The method of claim 1, further comprising:
   comparing the predictive location and the real time location; and
   determining the inaccuracy of the real time location when a difference between the real time location and the predictive location is different by a threshold distance.

4. The method of claim 1, further comprising:
   receiving information from a remote source, the information indicating the inaccuracy of the real time location.

5. The method of claim 4, wherein the remote source is a satellite based augmentation system.

6. The method of claim 4, wherein the remote source is a ground based augmentation system.

7. The method of claim 1, further comprising:
   receiving the information indicating the inaccuracy of the real time location from a GNSS receiver.

8. The method of claim 1, further comprising:
   outputting one of the real time location and the new real time location to at least one of a flight management system and an auto pilot system.

9. A system having a processor that determines a real time location of an aircraft, comprising:
   a real time filter operable to receive first location information from an inertial navigation system, operable to receive second location information from a global navigation satellite system (GNSS) receiver, and operable to determine real time location information of the aircraft based upon the inertial navigation system information and the GNSS information;
   a time interval unit operable to receive the second location information from the GNSS receiver, and operable to delay the received second location information by a time interval;
   a delay filter communicatively coupled to the time interval unit, operable to receive from the inertial navigation system the undelayed first location information, operable to receive from the time interval unit the second location information delayed by the time interval, and operable to determine predictive location information of the aircraft based upon the time interval, the undelayed first location information, and the second location information delayed by the time interval, wherein the delay filter determines the predictive location information while the real time filter determines real time location information;
   and an airborne GNSS device operable to identify a corruption of the second location information, and in response to determining that the second location information is corrupted, is further operable to cause the predictive location information to be output to at least one of a flight management system and an auto pilot system.

10. The system of claim 9, wherein the real time filter is a Kalman filter.

11. The system of claim 9, wherein the delay filter is a Kalman filter.

12. The system of claim 9, wherein the delay filter is operable to forward estimate the second location information by the time interval.

13. The system of claim 9, where in response to the airborne GNSS device determining that the second information is not corrupted, the real time location information is communicated to the at least one of the flight management system and the auto pilot system.

14. The system of claim 9, further comprising:
   a switch unit communicatively coupled to the real time filter, coupled to the delay filter, and coupled to at least one of the flight management system and the auto pilot system, and operable to be controlled by the airborne GNSS device,
   where in response to corruption of the second location information, the switch unit communicates the predictive location information to at least one of the flight management system and the auto pilot system.

15. The system of claim 14, where in response to determining no corruption of the real time location information, the switch unit communicates the real time location information to at least one of the flight management system and the auto pilot system.

16. The system of claim 9, further comprising:
   the inertial navigation system communicatively coupled to the real time filter and the delay filter.

17. The system of claim 9, further comprising:
   the GNSS receiver communicatively coupled to the real time filter and the time interval unit, and operable to determine the second location information of the aircraft based upon measurement information from a plurality of satellite signals emitted by a plurality of GNSS satellites, and operable to output the second location information.

18. The system of claim 9, further comprising:
   a processor system operable to compare the real time location information and the predictive location information, and operable to determine that the real time location information is corrupted when a difference between the real time location information and the predictive location information is different by a threshold.

* * * * *